United States Patent
Patel et al.

(10) Patent No.: US 10,635,627 B2
(45) Date of Patent: Apr. 28, 2020

(54) REDUNDANT COMMUNICATION SYSTEM TO INCREASE OPERATIONAL RELIABILITY

(71) Applicant: Toshiba International Corporation, Houston, TX (US)

(72) Inventors: Jigarkumar Lakshmanbhai Patel, Houston, TX (US); David Westmoreland, Houston, TX (US); Stephen A. Hallacy, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 16/115,785

(22) Filed: Aug. 29, 2018

(65) Prior Publication Data
US 2020/0073843 A1    Mar. 5, 2020

(51) Int. Cl.
*G06F 13/42* (2006.01)
*H04L 12/40* (2006.01)
*G06F 11/20* (2006.01)

(52) U.S. Cl.
CPC ........ *G06F 13/42* (2013.01); *H04L 12/40182* (2013.01); *G06F 11/2007* (2013.01); *G06F 2213/40* (2013.01); *H04L 2012/40215* (2013.01)

(58) Field of Classification Search
CPC .............................. G06F 13/42; G06F 11/2007
See application file for complete search history.

(56) References Cited

U.S. PATENT DOCUMENTS

| | | | |
|---|---|---|---|
| 5,390,326 A * | 2/1995 | Shah | G06F 11/2007 370/222 |
| 9,930,712 B2 | 3/2018 | Dewing et al. | |
| 2016/0241081 A1 * | 8/2016 | Nandam | H02J 9/06 |

OTHER PUBLICATIONS

ESEO Spacecraft: FMEA (Failure Mode and Effects Analysis) and FDIR (Fault Detection Isolation and Recovery) by Matteo Alberto Ferroni, 2016, 110 pages.

* cited by examiner

*Primary Examiner* — Zachary K Huson
(74) *Attorney, Agent, or Firm* — Baker Botts L.L.P.

(57) ABSTRACT

The presently disclosed embodiments are directed to an improved communication system that may have a plurality of control board modules and a display. The object of the disclosure is to transfer critical communication from the critical communication channel to the non-critical communication channel in the event of communication failure in the critical communication channel. Another object of the disclosure is to share data transfer between communication channels in order to manage bandwidth and system reliability.

20 Claims, 2 Drawing Sheets

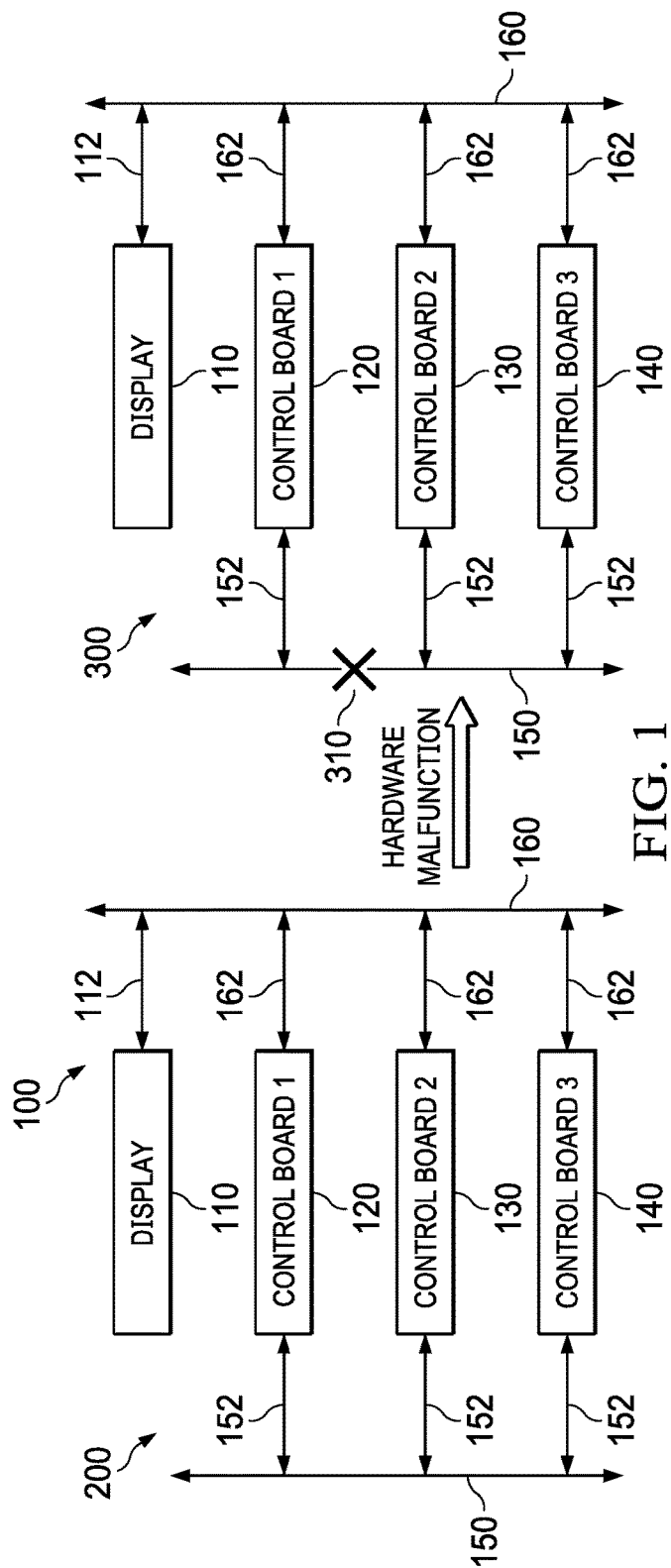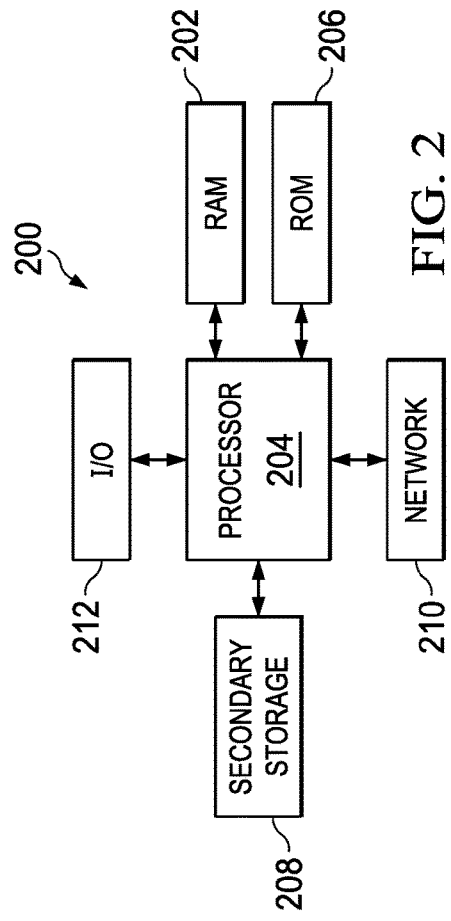

REDUNDANT COMMUNICATION SYSTEM TO INCREASE OPERATIONAL RELIABILITY

TECHNICAL FIELD

Embodiments of the present disclosure relate to communication systems and, more particularly, to redundant communication systems to increase operational reliability.

BACKGROUND

To increase reliability, communication systems may be designed to avoid communication failure by including redundant components that activate upon the failure of a primary component. To increase bandwidth, communication systems may be designed to include additional components that activate temporarily to increase the capabilities of the communication system.

Such designs maybe found in many types of wired and wireless communication systems. In wired communication systems, the Controller Area Network (CAN) bus is an increasingly used communication protocol. Generally speaking, a bus is a mechanism to transfer data between components in a system. A Controller Area Network is a network between components that are not otherwise connected to a network hosting device. Thus, a CAN bus is a communication protocol that allows components to communicate with each other without the use of a host computer. CAN buses were developed originally for use in the automotive industry but have since expanded to many other industries. The above described reliability and bandwidth concerns apply to CAN buses as well as to other communication protocols.

Additionally, communication systems may be used in the design of uninterruptable power supply (UPS) systems. A UPS system provides continual, uninterrupted electrical power through a means of backup electrical power. In short, a UPS improves the reliability of a power supply. To increase reliability further, one can design a multi-module UPS comprised of multiple UPSs in order to protect against UPS failure. In such multi-module systems, the multiple UPSs may be linked in series or in parallel.

In practice, uninterruptible power supplies (UPS) are used to maintain power to data center loads in the event of an input power source failure. The UPS system provides power to data center components until primary power is restored, a backup generator is turned on, or the components are appropriately shut down. Such UPS systems typically include multiple UPS modules that are electrically coupled to one or more data center loads. The number, capacity, and arrangement of these UPS modules can affect the reliability of the UPS system. For example, the number of UPS modules can be selected to be greater than a total number of UPS modules needed to power the connected loads operating at full power, thereby providing redundancy in the event that one of the UPS modules malfunctions. Data centers typically utilize UPS systems with at least some level of redundancy to prevent loss of data and system downtime.

SUMMARY

In accordance with the above, the presently disclosed embodiments are directed to an improved communication system that has increased reliability and increased bandwidth capability. A problem in previous communication system designs is communication failure due to failure in a communication bus or other communication channel. An object of the disclosure is to improve the reliability of a communication system by having a redundant communication system comprising a critical communication channel, a non-critical communication channel, and a plurality of control board modules wherein each control board module is coupled to both said critical communication channel and said non-critical communication channel. Further, each control board module is configured to, by default, transmit critical information over said critical communication channel, wherein each control board module is configured to, by default, transmit non-critical information over said non-critical communication channel. Even more, each control board module is configured to transmit at least one heartbeat signal over said critical communication channel and further to transmit at least one heartbeat signal over said non-critical communication channel. In such a system, a master module may be coupled to both said critical communication channel and said non-critical communication channel wherein said master module is configured to receive from each control board module said at least one heartbeat signal transmitted over said critical communication channel and said at least one heartbeat signal transmitted over said non-critical communication channel. Further, said master module is configured to command at least one of said plurality of control board modules to transmit all critical communication over said non-critical communication channel if said master module fails to receive an expected heartbeat signal over said critical communication channel from at least one of said plurality of control board modules.

Another object of the disclosure is to improve the bandwidth of a communication system by sharing data between said critical and said non-critical communication channels at the same time when more bandwidth is needed or desired than can be provided by one of said critical channel or non-critical channel.

BRIEF DESCRIPTION OF THE DRAWINGS

For a more complete understanding of the present disclosure and its features and advantages, reference is now made to the following description, taken in conjunction with the accompanying drawings, in which:

FIG. 1 is two diagrams of a communication system, showing the system before and after failure in a critical communication bus, in accordance with certain embodiments of the present disclosure;

FIG. 2 is a diagram of the components of an information handling system, in accordance with an embodiment of the present disclosure;

DETAILED DESCRIPTION

Figure 3:
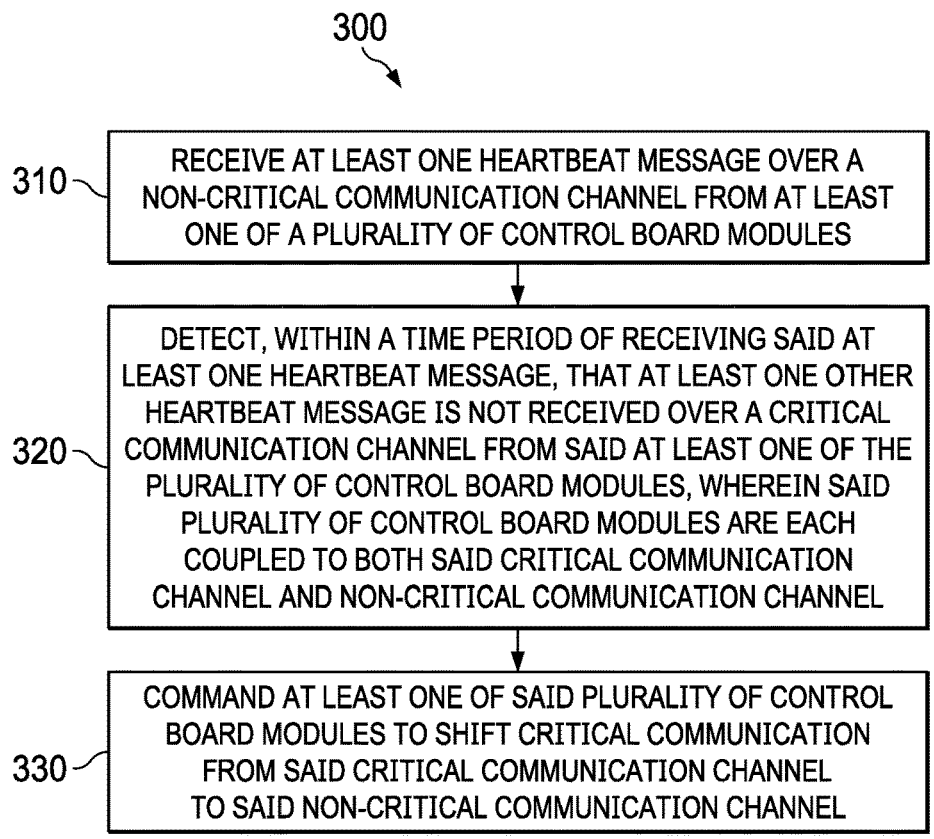
FIG. 3 is a flowchart showing an example of how the disclosed system may be implemented as a method, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

Turning now to the drawings, referring to FIG. 1, the disclosure is directed to an improved communication system that may have a plurality of control board modules and a display. Diagram 100 shows the same system in two different states 200 and 300, which will be explained below. Turning to diagram 200, in this particular embodiment, system 200 has three control board modules 120, 130, and 140. However, other embodiments may have fewer or more control board modules than shown in FIG. 1. Each of these control board modules may be contained in separate UPS modules or other devices, for example. In this embodiment, control board modules 120, 130, and 140 are coupled 152 to a critical communication bus 150 and coupled 162 to a non-critical communication bus 160. In this embodiment, display 110 couples 112 only to the non-critical communication bus 160.

Both critical communication bus 150 and non-critical communication bus 160 are buses capable of transmitting data between components of a communication system, computer system, or other such electronic system. Generally, buses may comprise hardware components, such as, but not limited to, wire and optical fiber, and software components, such as communication protocols. In some embodiments, the communication buses are in the form of Controller Area Network (CAN) buses. The main difference between critical communication bus 150 and non-critical communication bus 160 may be the type of data that is transferred over said buses. Critical communication bus 150 may transfer critical information related to critical functions of system 200.

Examples of critical information include but are not limited to commands related to system control, output voltage synchronization and how to respond to power outages. In embodiments where control board modules 120, 130, and 140 are UPS modules, critical communication bus 150 transmits data that causes said UPS modules to share load current equally. In parallel multi-module UPS systems, proper operation may require the sending of critical control data over the critical communication bus to make sure that the plurality of UPS modules share load current equally. In such systems, failure of communication may cause loss of UPS operation.

Non-critical communication bus 160 may transfer non-critical information of system 200. Examples of non-critical information include but are not limited to data that would be displayed for the end user on display 110, such as voltage, current, and system settings of the UPS modules. Control board modules 120, 130, and 140 may be set by default to transfer critical data over the critical communication bus 150 and to transfer non-critical data over the non-critical communication bus 160.

In some embodiments, display 110 may be an LCD screen that displays data from the non-critical communication bus 160. In other embodiments, display 110 may be connected to both critical communication bus 150 and non-critical communication bus 160, thereby displaying data from both buses.

Control board modules 120, 130, and 140 may be modules that are embedded into components that are essential for the operation of the system 200. In some embodiments, control board modules 120, 130, and 140 may be coupled to individual uninterruptible power supply (UPS) modules, which would make system 200 a UPS system. Other components of the improved communication system, which are not shown in FIG. 1, include but are not limited to an Input LC filter, DC BUS, output LC Filters, an IGBT, and a battery. In other embodiments, control board modules 120, 130, and 140 may be coupled to individual batteries, which would make system 200 a battery cabinet. In other embodiments, control board modules 120, 130, and 140 may be coupled to individual variable-speed drives, which would make system 200 a parallel drive system. Generally, control board modules 120, 130, and 140 may be coupled to any devices in a system where the devices communicate with each other.

During normal operation, such as in diagram 200, at least one control board module 120, 130, and 140 may send at least one heartbeat signal (not shown) over critical communication bus 150 and may send at least one heartbeat signal (not shown) over non-critical communication bus 160. In some embodiments, every control board module may send such heart beat signals. In some embodiments, each control board module may send more than one heartbeat signal such as, for example, heartbeat signals sent periodically or in a sequence. In some embodiments, each control board module may send heartbeat signals over both the critical communication bus 150 and the non-critical communication bus 160.

Additionally, each control board module may be configured to receive heartbeat signals as well. In some embodiments, at least one of the control board modules 120, 130, and 140 may receive the heartbeat signals from the other control board modules and, thereby, record the presence and connection of the other control board modules to critical communication bus 150 or non-critical communication bus 160. In some embodiments, at least one of control board modules 120, 130, and 140 may be configured to maintain a list of control board modules that it has detected as being connected to critical communication bus 150 or non-critical communication bus 160. Specifically, at least one control board module may be configured to receive from at least one other control board module at least one heartbeat signal over said critical communication bus and at least one heartbeat signal over said non-critical communication bus, thereby allowing said control board module to record whether said at least one other control board module is coupled to said critical and non-critical communication buses. For example, in some embodiments, all control board modules can be configured to receive at least one heartbeat signal over both buses from all other control board modules, thereby allowing each control board module to have a complete list of all other coupled control board modules. A person of ordinary skill would understand that any number of control board modules, equal to or less than the total number of control board modules in the system, could be configured to record the presence of other control board modules.

At least one control board module in system 200 is capable of being a master control module. In some embodiments, all control board modules in system 200 are capable of being a master control module. The master control module is a single module that is capable of sending commands to all other control board modules that cause all other control board modules to shift data transfer and data communication between critical communication bus 150 and non-critical communication bus 160. Further, each control board module may contain data tables and algorithms that allows the control board module to determine whether it is the master control module, or to assume the role of master when necessary, such as after a failure of the current master or current master module removed by user. In such an algorithm, each control board module may have a priority list or active module list of all other modules connected to system 200 that determines which module is the master control module. This priority list or active module list may be designed into the algorithm and may be based on the physical location of the control modules in the system. However, a person of ordinary skill will appreciate that the control board modules may be rank on the priority list in any way that the designer finds useful.

In the event that the control board modules determine that the master control module is disconnected from system 200, perhaps due to a failure to receive a heartbeat message from the master control module, the control board modules may run said algorithm that allows each module to independently determine if it is the new master control module. Upon each module completing this algorithm, one control board module may determine that it is the new master control module and, thereby, assumes the same command position as the previous master control module.

Turning to diagram 300 of FIG. 1, diagram 300 shows the system 200 where a fault 310 has occurred in critical communication bus 150. If the master control module receives a heartbeat signal from a control board module over non-critical communication bus 160 but does not receive a heartbeat signal from a control board module over critical communication bus 150, then the master control module may determine that such control board module is no longer accessible through critical communication bus 150. When an expected heartbeat signal is not able to cross a bus and reach the master control module, then such bus may be considered to be in a fault state. If the master control module determines that a control board module can no longer receive or send data through critical communication bus 150 due to the failure to detect a heartbeat signal from such control board module, then the master control module may command at least one of the control board modules to redirect some or all data transfer or data communication to the non-critical communication bus 160. In some embodiments, the master control module may command all control board modules 120, 130, and 140 to shift all communication data to the non-critical communication bus 160.

In other embodiments, there may not be a master control module. In such embodiments, a particular module may determine, by itself, that a control board module can no longer receive or send data through critical communication bus 150 due to that particular module's failure to detect a heartbeat signal from such control board module. In such instances, said particular module may, by itself, redirect some or all data transfer or data communication to the non-critical communication bus 160. In such embodiments, all modules may be able to act independently such that each module independently detects that a control board module can no longer receive or send data through critical communication bus 150, and may also independently redirect some or all data transfer or data communication to the non-critical communication bus 160.

Specifically, the master control module may determine that a communication bus is in a fault state if it does not receive an expected heartbeat signal from another control module, or does not receive an expected heartbeat signal within a designated time window. A person of ordinary skill would understand that, due to differences in physical characteristics of the critical and non-critical communication buses, or any two buses in general, two heartbeat signals sent by the same control board module at the same time on two different buses may not reach the master control module at the exact same time. Thus, the master control module may be configured to tolerate a difference in arrival times of the two heartbeat signals. This time period may be configured based on the specific construction of the communication buses at hand.

In some embodiments, if a heartbeat signal arrives later than expected by the time window, the master control module may interpret this as the control bus being broken between the master control module and the control board module that sent the heartbeat signal. Also, in some embodiments, if a heartbeat signal arrives sooner than expected by the time window, then the master control module may interpret this as the wrong heartbeat signal. The master control module also may interpret the heart beat signal as being corrupt, or simply an unexpected heartbeat signal. Also, the master control module may interpret this as a heartbeat signal that was transmitted incorrectly by a control board module. Generally, if the master control module receives too many irregular heartbeat signals from many different control board modules across the same communication bus, then the master control module may interpret this as bus failure.

Causes of bus failure include but are not limited to mechanical failure, physical weakening of the bus due to thermal stress, or electromagnetic interference from nearby equipment or newly installed equipment.

In some embodiments, the master control module may send a signal to display 110 that informs display 110 that some or all communication has transferred to the non-critical communication bus 160. In such circumstances, display 110 may be able to adjust the update speed of the displayed data on the display screen of 110. In the event that some or all communication is transferred from critical communication bus 150 to non-critical communication bus 160, the available bandwidth on the non-critical communication bus 160 may decrease rapidly due to the transferred data. In such circumstances, display 110 may adjust the update speed of any type of displayed data in order to manage the decreased available bandwidth due to the communication transfer. For example, the display 110 may update slower in order to deal with the reduced bandwidth. Also, the display 110 may prioritize information such that some information is updated at a faster speed than other information.

Also, in embodiments where system 200 is a UPS system, the master control module may negotiate how to share the excess load if at least one UPS module disconnects from the system or stops functioning.

Referring now to FIG. 2, the master control module may be in communication with an information handling system, which in some embodiments may be a computer system. The computer system may be configured to output commands to at least one control board module based on signals received from the master control module. Also, the computer system may be configured to command the master control module to, in turn, output commands to at least one control board module based on signals received from the master control module. Additionally, the computer system may receive the heartbeat signals directly from the control board modules or through the master control module. As those of ordinary skill in the art will appreciate, the computer may be equipped with a computer memory storage (and optionally a local processor) so that it can store (and also optionally at least partially process) the heartbeat signals, or signals from the master control module, that it receives.

The computer system, which may be in communication with the master control module and/or at least one control board module, is capable of receiving heartbeat signals directory from the control board modules or through the master control module. Additionally, the computer system is capable of receiving a signal from the master control module indicating whether or not the master control module received said heartbeat signals. As a person of ordinary skill would appreciate, the computer system may be connected to the master control module and/or at least one control board module by way of a wired connection or a wireless connection. The computer system may include at least one processor and at least one memory, the memory comprising a plurality of non-transitory executable instructions that, when executed, cause the at least one processor to determine if said master module failed to receive an expected heartbeat signal over said critical communication bus from at least one of said plurality of control board modules. Also, the computer system may command at least one of said plurality of control board modules to transmit all critical communication over said non-critical communication bus if said computer failed to receive an expected heartbeat signal over said critical communication bus from at least one of said plurality of control board modules. As described previously, a person of ordinary skill in the art would appreciate that the command signal may be sent over a wired or wireless connection to the master control module or directly to the module control boards.

Referring to FIG. 2, in some embodiments the computer system 200 may be in the form of an information handling system. For purposes of this disclosure, an information handling system or computing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM) 202, one or more processing resources 204 such as a central processing unit (CPU) or hardware or software control logic, ROM 206, and/or other types of nonvolatile memory 208. Additional components of the information handling system may include one or more disk drives (not shown), one or more network ports 210 for communication with external devices as well as various input and output (I/O) devices 212, such as a keyboard, a mouse, and a video display. The information handling system may also include one or more buses (not shown) operable to transmit communications between the various hardware components. Example information handling systems include server systems, computer terminals, handheld computing devices, tablets, smartphones, etc.

FIG. 3 is a flowchart 300 showing an example of how the disclosed system may be implemented as a method. In step 310, the master control module may receive at least one heartbeat message over a non-critical communication bus from at least one of a plurality of control board modules. In step 320, the master control module may detect, within a time period of receiving said at least one heartbeat message, that at least one other heartbeat message is not received over a critical communication bus from said at least one of the plurality of control board modules, wherein said plurality of control board modules are each coupled to both said critical communication bus and non-critical communication bus. This failure to detect a heartbeat signal over the critical communication bus may indicate to the master control module that the control board module at issue is no longer coupled to the critical communication bus. In step 330, in response to the result in step 320, the master control module may command at least one of the plurality of control board modules to shift critical communication from the critical communication channel to the non-critical communication channel, thereby allowing critical communication to continue uninterrupted.

Figure 4:
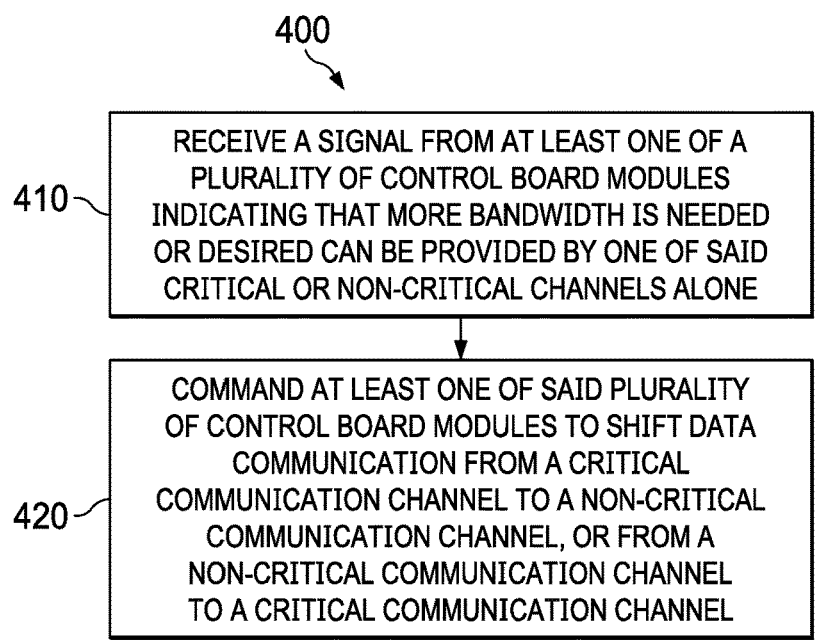
FIG. 4 is a flowchart showing an example of how the disclosed system may be implemented as a method, in accordance with an embodiment of the present disclosure.

Referring back to diagram 200 of FIG. 1, in another embodiment of this disclosure, the master control module may shift or share communication between critical communication bus 150 and non-critical communication bus 160 in the event that more bandwidth is needed or desired than can be provided by one of said critical or non-critical buses alone. FIG. 4 is a flowchart showing an example of how the disclosed system may be implemented as a method. In step 410, the master control module may receive a signal from at least one of a plurality of control board modules indicating that more bandwidth is needed or desired than can be provided by one of said critical or non-critical buses alone. In step 420, to accommodate the need, the master control module may command at least one of the control board modules to shift data communication from a critical communication bus to a non-critical communication bus, or from a non-critical communication bus to a critical communication bus.

The computer system coupled to the master control module may be configured to output commands to at least one control board module based on signals received from the master control module. Also, the computer system may be configured to command the master control module to, in turn, output commands to at least one control board module based on signals received from the master control module. Additionally, the computer system may receive any communication or information indicating that more bandwidth is needed or desired than can be provided by one of said critical or non-critical buses. As those of ordinary skill in the art will appreciate, the computer may be equipped with a computer memory storage (and optionally a local processor) so that it can store (and also optionally at least partially process) the heartbeat signals, or signals from the master control module, that it receives.

The computer system, which may be in communication with the master control module and/or at least one control board module, may receive any communication or information indicating that more bandwidth is needed or desired than can be provided by one of said critical or non-critical buses. As a person of ordinary skill would appreciate, the computer system may be connected to the master control module and/or at least one control board module by way of a wired connection or a wireless connection. The computer system may include at least one processor and at least one memory, the memory comprising a plurality of non-transitory executable instructions that, when executed, cause the at least one processor to determine if said master module received a signal indicating that more bandwidth is needed or desired than can be provided by one of said critical or non-critical buses. Also, the computer system may command at least one of said plurality of control board modules to transmit all or some critical communication over said non-critical communication bus if said computer received a signal indicating that more bandwidth is needed or desired. As described previously, a person of ordinary skill in the art would appreciate that the command signal may be sent over a wired or wireless connection to the master control module or directly to the module control boards.

In some embodiments, the master control module may send a signal to display 110 that informs display 100 that some or all communication has transferred to the non-critical communication bus 160. In such circumstances, display 110 may be able to adjust the update speed of the displayed data on the display screen of 110. In the event that some or all communication is transferred from critical communication bus 150 to non-critical communication bus 160, the available bandwidth on the non-critical communication bus 160 may decrease rapidly due to the transferred data. In such circumstances, display 110 may adjust the update speed of any type of displayed data in order to manage the decreased available bandwidth due to the communication transfer. For example, the display 110 may update slower in order to deal with the reduced bandwidth. Also, the display 110 may prioritize information such that some information is updated at a faster speed than other information.

The above description discloses many embodiments where critical communication, non-critical communication, and heartbeat signals occur across CAN buses or other communication networks. However, such communication and signals may be performed across other types of wired communication media, such as, but not limited to, coaxial cable, fiber optic cable, and twisted pair cable. In such embodiments, critical and non-critical communication may be across two separate wires that connect the control board modules and the master control module.

In some embodiments, critical communication, non-critical communication, and heartbeat signals may occur through wireless communication methods such as wireless networks, infrared communication, microwave communication, radio, or satellite transmission. In such embodiments, critical and non-critical communication may be across two different types of modulation, such as different frequencies, amplitudes, and/or phases. Additionally, in some embodiments, critical communication, non-critical communication, and heartbeat signals may occur through various data communication protocols, such as, but not limited to, Wi-Fi, Bluetooth, LTE, WiMax, Z-Wave, or Zigbee.

In some embodiments, systems, critical communication, non-critical communication, and heartbeat signals may occur through various multiplexing techniques, such as CDMA, FDMA, TDMA, CDMA, OFDMA, and/or SDMA. Such multiplexing systems may be implemented in both wired and wireless systems.

The above disclosure can be applied to parallel multi-module UPS systems as well. In such embodiments, the control board modules may be individual UPS modules and the master control module may be a controller. This parallel UPS system may utilize load distribution power switching elements under the control of the controller (i.e., master control module). In some embodiments, the control may contain a computer or other such programmable logic controller (PLC). The load distribution elements may take the form of a number of power distribution units (PDUs) electrically coupled between the individual UPS modules and the loads. The PDUs may include any desired type of distribution unit such as, for example, automatic distribution units (ADUs), dual-input PDUs, or static switch PDUs. In addition to the load distribution power switching elements, the PDUs may each include electrically operated circuit breakers and sensor components (e.g., current sensing components, breaker position sensing components). These electrical components may be communicatively coupled to the PLC of the MMS system.

The power switching elements of the parallel UPS system may be designed such that the outputs of at least two UPS modules are parallel by connecting both UPS modules to a given load. In such embodiments, the controller may detect the paralleled condition of the UPS modules by way of data sent from the modules or the PDUs through the critical communication channel or non-critical communication channel to the controller. Upon detecting such condition, the controller may send control signals, through the critical communication channel or non-critical communication channel, to the UPS modules that are in parallel to share the load equally. A person of ordinary skill in the art would know that such a design could be applied to systems where more than two UPS modules are connected in parallel.

Also, in some embodiments, the controller may generate control signals to command the UPS modules to stop the load-sharing operation and to operate individually. For example, when maintenance or repairs are required on one of the UPS modules, the controller may disconnect the particular UPS module from the load and shift the load from the disconnected UPS module onto the modules that are still connected in parallel. Also, the controller may do this on its own upon detecting that a UPS module is in fault, by way of data sent along the critical communication channel or non-critical communication channel. The ability of the controller to change modes of the UPS modules between single module operation and paralleled operation facilitates maintenance in a manner which allows users of high-reliability parallel UPS systems to achieve maximum system reliability and maintainability with minimum capital and operational expenditure, since fewer UPS modules are needed.

What is claimed is:

1. A redundant communication system comprising:
   a critical communication bus;
   a non-critical communication bus;
   a plurality of control board modules;
      wherein each control board module is coupled to both said critical communication bus and said non-critical control bus,
      wherein each control board module is configured to transmit critical information over said critical communication bus,
      wherein each control board module is configured to transmit non-critical information over said non-critical communication bus,
      wherein each control board module is configured to transmit at least one heartbeat signal over said critical communication bus and to transmit at least one heartbeat signal over said non-critical communication bus,
      wherein the heartbeat signals are transmitted simultaneously across the critical and non-critical communication buses,
      wherein one control board module is a master control module that is configured to receive from each control board module said at least one heartbeat signal transmitted over said critical communication bus and said at least one heartbeat signal transmitted over said non-critical communication bus,
      wherein said master control module is configured to command at least one of said plurality of control board modules to transmit critical communication over said non-critical communication bus if said master module fails to receive an expected heartbeat signal over said critical communication bus from at least one of said plurality of control board modules, wherein the master control module is configured to receive a signal from at least one of the plurality of control board modules indicating that more bandwidth is needed than can be provided by one of the critical or non-critical buses alone.

2. The system of claim 1 further comprising a computer in communication with said master control module, the computer including at least one processor and at least one memory, the memory comprising a plurality of non-transitory executable instructions that, when executed, cause the at least one processor to:
determine if said master control module failed to receive at least one heartbeat signal over said critical communication bus; and
command at least one of said plurality of control board modules to transmit critical communication over said non-critical communication bus if said master module failed to receive said at least one heartbeat signal.

3. The system of claim 1 wherein the simultaneous heartbeat signals are periodic.

4. The system of claim 1 wherein the critical communication bus and the non-critical communication bus comprise Controller Area Network (CAN) buses.

5. The system of claim 1 wherein at least one control board module other than the master control module is configured to receive heartbeat signals transmitted on the critical communication bus and non-critical communication bus.

6. The system of claim 5 wherein at least one of the control board modules maintains a list of other control board modules from which it received heartbeat signals.

7. The system of claim 1 further comprising a display coupled to said non-critical communication bus that displays data transmitted on the non-critical communication bus.

8. The system of claim 1 wherein the control board modules are configured to share data using both the critical and non-critical communication buses according to bandwidth availability.

9. The system of claim 1 wherein the control board modules comprise uninterruptible power supply (UPS) modules.

10. A communication method comprising:
transmitting simultaneous heartbeat messages, by way of a plurality of control board modules, over a critical communication bus and a non-critical communication bus;
detecting whether the simultaneous heartbeat messages are transmitted by each of the control board modules over a predetermined time period;
commanding the control board modules to shift critical communication from the critical communication bus to the non-critical communication bus if at least one heartbeat message is not detected from a control board module within the predetermined time period; and
receiving a signal from at least one of the plurality of control board modules indicating that more bandwidth is needed than can be provided by one of the critical or non-critical buses alone by a master control module, wherein the master control module is one of the plurality of control board modules.

11. The method of claim 10 wherein a master control module detects whether the simultaneous heartbeat messages are transmitted by each of the control board modules over the predetermined time period and commands the control board modules to shift communications to the non-critical communication bus if at least one heartbeat message is not detected from a control board module within the predetermined time period.

12. The method of claim 10 wherein said critical communication bus and said non-critical communication bus comprise Controller Area Network (CAN) buses.

13. The method of claim 10 further comprising displaying, on a display coupled to the non-critical communication bus, data transmitted on the non-critical communication bus.

14. The method of claim 10 wherein the control board modules comprise uninterruptible power supply (UPS) modules.

15. A communication method comprising:
receiving a signal from at least one of a plurality of UPS control board modules indicating additional bandwidth is required; and
in response to the signal, commanding at least one of the plurality of UPS control board modules to shift data communication from a critical communication channel to a non-critical communication channel, or from a non-critical communication channel to a critical communication channel, depending on available bandwidth.

16. The method of claim 15 wherein said receiving of a signal from at least one of a plurality of control board modules and said shifting of data communication is performed by a master control module.

17. The method of claim 15 wherein a master control module receives heartbeat messages and commands the shifting of critical communication from said critical communication channel to said non-critical communication channel.

18. The method of claim 15 wherein said critical communication channel and said non-critical communication channel comprise Controller Area Network (CAN) buses.

19. The method of claim 15 further comprising displaying, on a display coupled to said non-critical communication channel, data transmitted on the non-critical communication channel.

20. The method of claim 15 further comprising transmitting from at least one of the plurality of UPS control board modules data that allows said UPS modules to share load current equally.

* * * * *